Patented Jan. 28, 1947

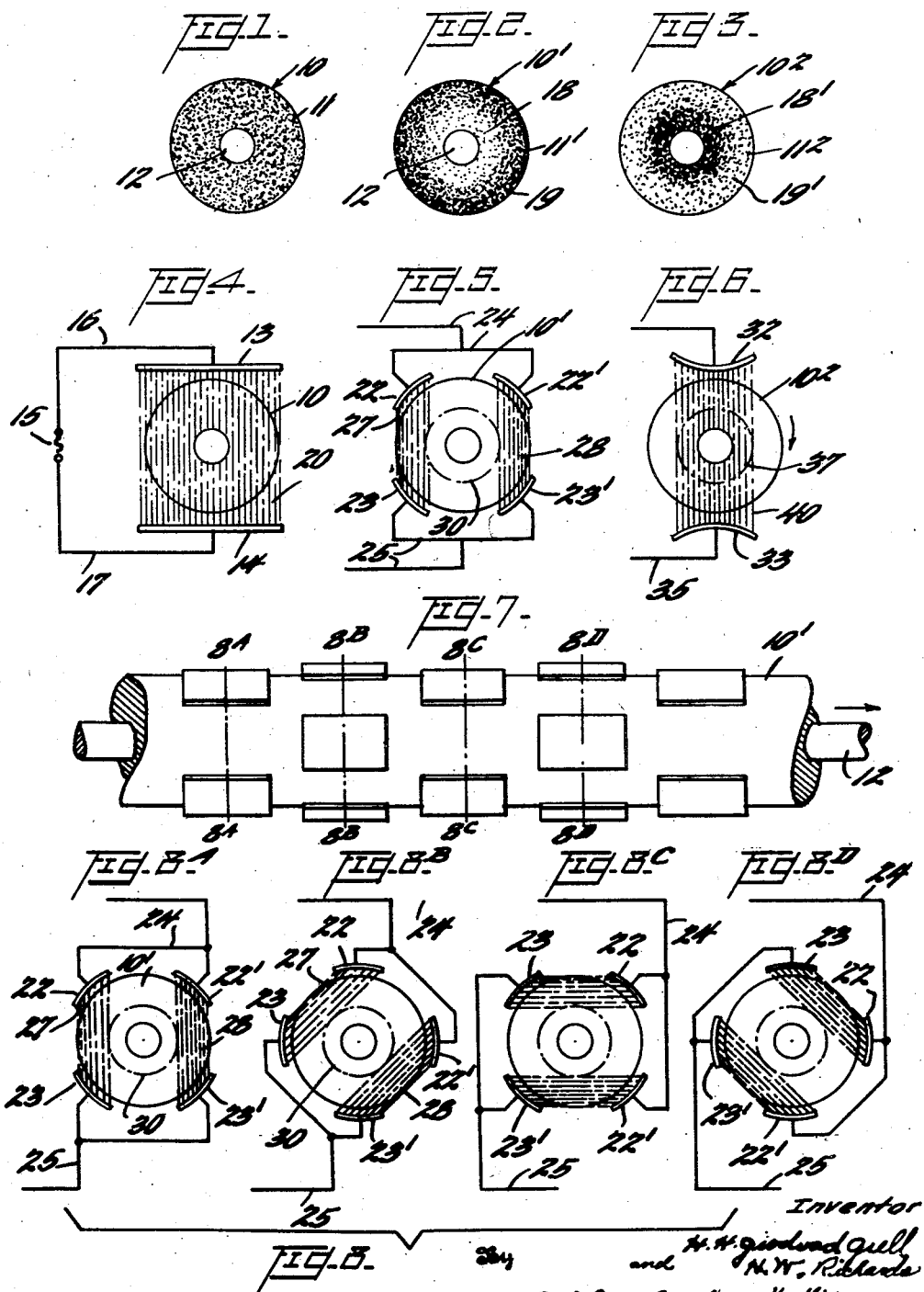

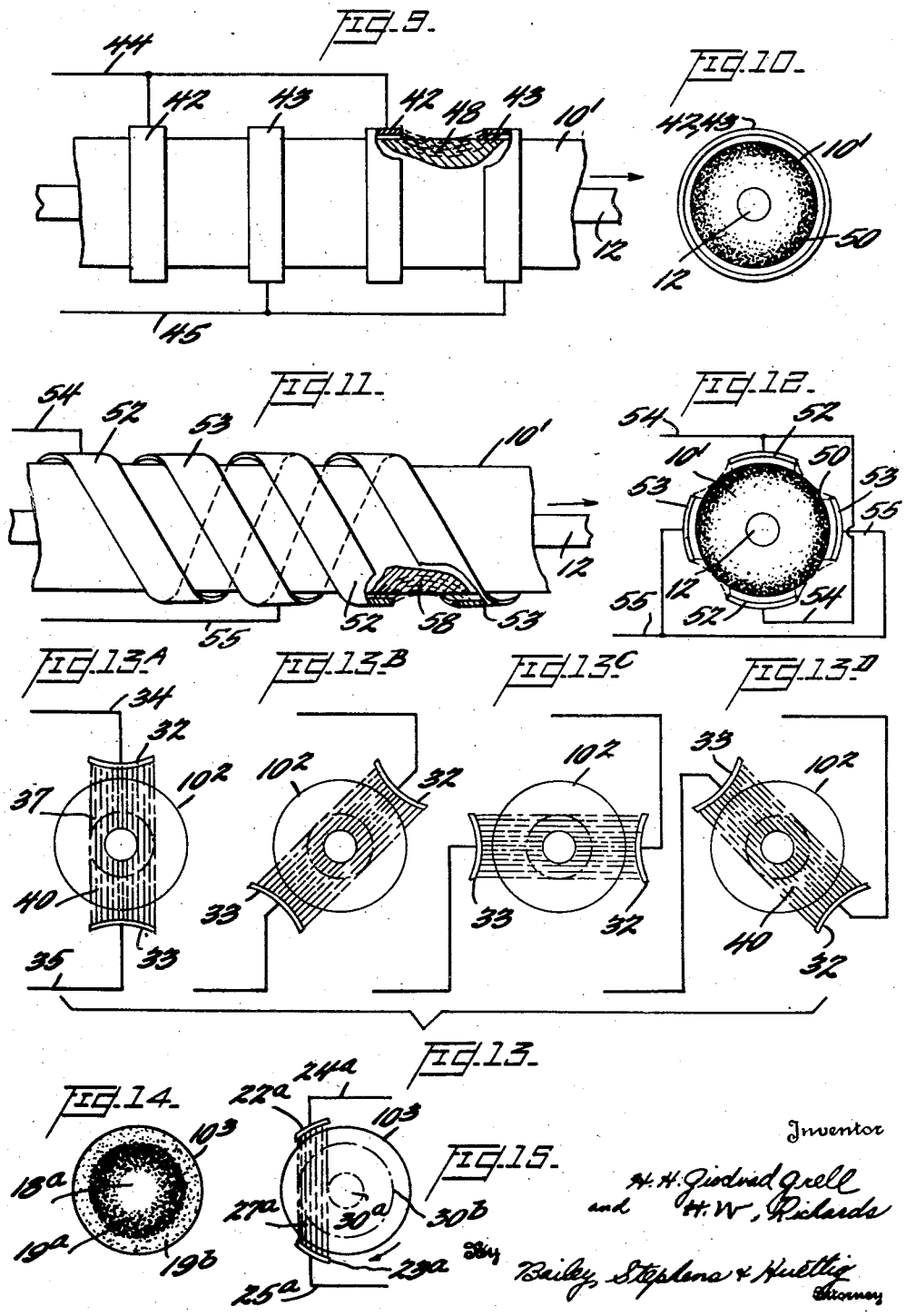

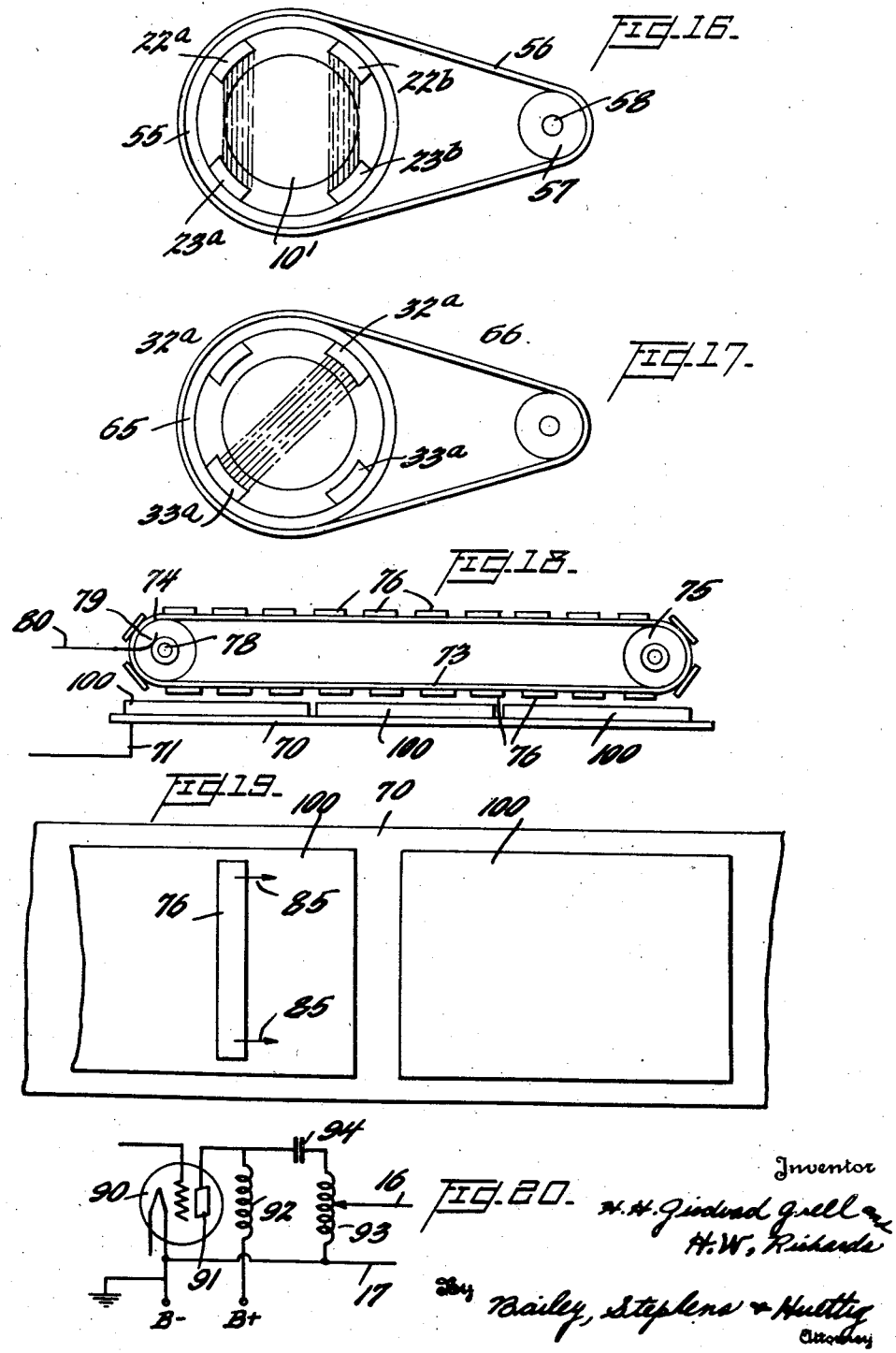

2,415,025

UNITED STATES PATENT OFFICE 2,415,025

METHOD AND APPARATUS FOR TREATING MATTER IN A HIGH-FREQUENCY ELECTRIC FIELD

Herm H. Giodvad Grell, New York, N. Y., and Harry W. Richards, East Orange, N. J., assignors, by direct and mesne assignments, to The Firestone Tire and Rubber Company, a corporation of Ohio, and The B. F. Goodrich Company, a corporation of New York Application April 22, 1943, Serial No. 484,092

14 Claims. (Cl. 219—47)

This invention relates to the electrical treatment of matter and more particularly to processes and apparatus for the treatment of matter by subjecting it to the action of an alternating electrostatic field, preferably of high or relatively high frequency, and utilizing the high frequency energy for the production of heat or other effects therein. The subject matter of the present application is similar to that disclosed in the U. S. Letters Patent to Dufour and Leduc Nos. 2,280,771, 2,261,847, and others owned by the assignees of the present application.

When a homogeneous dielectric is placed in a uniform electrostatic field of high frequency, the material becomes uniformly heated throughout its mass; any rise in temperature or heating effect increasing with the frequency and the density of the field. Dielectric losses thus produced under the influence of high frequency electric currents may be used for the treatment of many different kinds of material. Merely as an example of the use of the present invention, the vulcanization of rubber or other materials will be mentioned herein in connection with certain specific disclosures, but it is understood that the invention in its broader aspects is not so limited.

The principle of high frequency electrostatic heating has been adverted to in the patents above mentioned and a widely accepted underlying theory may be briefly explained. If the molecules of a substance are disturbed—for instance rubbed against each other—heat is produced by the friction, just as heat is produced when two sticks of wood are rubbed together to eventually produce a blaze.

In high frequency electrostatic heating, the electrical energy acts upon the molecules of the substance within the field influenced by said energy causing the molecules to change shape. When the polarity or direction of the electric field is reversed the molecules assume a different shape, and this occurs with each successive reversal of polarity. When the electrical field is reversed millions of times per second, the friction created between the molecules quickly produces a large amount of heat within the substance being treated.

In utilizing electrostatic energy for the production of heat, or other effects, it is general practice to employ a pair of plate electrodes disposed one upon each side of the work and to connect these electrodes to opposite sides of a high frequency source. The present invention contemplates the provision of novel forms and arrangements of electrodes for applying heat to the material under treatment so that the heating may be either uniform throughout the mass or, at the option of the operator, intensified at certain points therein.

One of the principal objects of the invention therefore is the provision of simple and novel forms of electrodes and arrangements of the electrodes and the mass to be treated, whereby relative movement between the mass and the electrodes is attained and the treatment of the mass applied uniformly throughout the mass, concentrated in the outer portions thereof, or intensified at the central portions of the mass, as may be desired. By having the material continuously in motion relative to the electrodes, the time required for heat treating is reduced to a minimum and a uniform finished product is obtained.

A great variety of different materials—solid, liquid, colloidal, or plastic—may be treated within the purview of the present invention. As an example there may be mentioned the vulcanization of rubber or other materials, especially those in which a varying effect in different portions of the mass may be desired.

Thus, another more particular object of the invention is to produce through a certain arrangement of electrodes or means for transmitting pulsating current or producing an electrostatic field, an underlying section of relatively hard or semi-hard rubber combined with an exterior section of softer rubber; for example, in order to assure a more perfect adherence of the coating or insulating covering to the surface of an embedded wire or other metallic core. This form of heat treatment is particularly adapted to the making of printing press rollers and the like, wherein the rubber or other roller composition may be made fast to the metallic core. On the other hand, by a suitable variation in the arrangement of the electrodes or electrostatic field producing elements, the interior portion of the coating material can be made softer than the outer portion, for example, this particular treatment may be applied to insulated electrical conductors so that the insulation can be readily stripped from the conductor as when electrical connections are to be made thereto.

Difficulties which have been experienced heretofore owing to the low thermal conductivity of rubber are entirely eliminated by the present process by means of which uniform and rapid vulcanization may be obtained. It is also possible to vulcanize thick masses of material just as rapidly as in the case of a thin strip.

The principles of the invention may also be applied to the oxidation of a mass utilizing one or more moving electrodes and one or more stationary electrodes, with the intervening mass either stationary or in motion. Furthermore, the drying of ink on freshly printed copy may be effected to prevent offset, as well as any other type of drying, oxidation, curing, polymerizing, or agglomerating of non-metallic materials.

The invention contemplates in each case the provision of means whereby the material may be moved with respect to the electrodes, and it also embraces means whereby the same effects may be produced by moving the electrodes with respect to the material being treated.

Other objects and features of novelty will be apparent from the following specification when read in connection with the accompanying drawings in which certain embodiments of the invention are illustrated by way of example.

In the drawings:

Figure 1 is a diagram indicating the uniform effect throughout a mass of treated material which is obtained by the use of parallel electrodes throughout the full diameter of the mass, as for example by means of the arrangement shown in Figure 4;

Figure 2 is a similar diagram showing the effect of a selective treatment of the outer portion of a mass, as for example by the means shown in Figure 5;

Figure 3 is another diagram indicating the effect of treatment as for example by the means shown in Figure 6, in which the interior or central portion of the mass receives a more intense treatment than the outer portions thereof;

Figure 4 is a somewhat diagrammatic showing of an arrangement whereby a mass of material may be treated uniformly throughout by means of an electrostatic field; and in which the mass being treated may be either stationary or rotating about the central axis;

Figure 5 is a similar view showing a circular mass of material being treated by an electrostatic field in order to effect a change in its outer portions only, producing a result as indicated in Figure 2;

Figure 6 is a similar view showing a rotating circular mass being treated by an electrostatic field so as to obtain an intensified effect at the center of the mass, the product being suggested by the diagram in Figure 3;

Figure 7 is a diagrammatic view, substantially in side elevation, of a mass of material being treated by being drawn longitudinally through successive series of pairs of electrodes arranged in staggered relationship so as to produce a product similar to that indicated in Figure 2 and similar to the effect produced by the means shown in Figure 5;

Figure 8 is a collective diagrammatic showing of successive transverse cross sections taken on lines 8A—8A, 8B—8B, 8C—8C, and 8D—8D and designated respectively by the subordinate figure designations 8A, 8B, 8C, and 8D;

Figure 9 is a diagrammatic view substantially in side elevation of a mass of material being treated by being drawn longitudinally through a series of annular electrodes, in order to attain an external or skin treatment, the effect being somewhat similar to that indicated in Figure 2; part of the arrangement being shown in cross section to indicate the approximate extent of the electrostatic field between adjacent electrodes;

Figure 10 is a diagrammatic end view of the device shown in Figure 9;

Figure 11 is a diagrammatic view similar to those shown in Figures 7 and 9 but in which the mass of material is being drawn through helical electrodes in order to attain a marginal treatment similar to that suggested in Figures 10 and 2; part of the arrangement being shown in cross section to indicate the approximate extent of the electrostatic field between adjacent electrodes;

Figure 12 is a diagram suggestive of a transverse cross section through the device shown in Figure 11;

Figure 13 is a collective diagrammatic showing of successive transverse cross sections through an arrangement such as illustrated in Figure 7 but in which only two oppositely disposed electrodes are employed in each group, as in Figure 6, but in which successive groups of electrodes are angularly displaced or staggered, in order to attain an effect as suggested in Figure 3, by means of drawing the material longitudinally through the series of spirally offset electrode groups; the successive sections of Figure 13 being indicated by the subordinate figure designations 13A, 13B, 13C, and 13D;

Figure 14 is a diagram of the type shown in Figures 1, 2, and 3, showing a mass having an intermediate annular zone treated more intensely than either the center or outer portions;

Figure 15 is a view similar to Figures 4, 5, and 6 showing means for producing the effect illustrated in Figure 14;

Figure 16 is a diagrammatic view of an apparatus for treating a mass of material to attain a product as suggested in Figure 2 and by means of a device similar to that shown in Figure 5, but in which the electrodes are rotated around the material;

Figure 17 is a view similar to Figure 14 showing rotatable electrodes for attaining an effect as suggested in the diagram of Figure 3 by employing diametrically oppositely arranged electrodes as in Figure 6;

Figure 18 is a view in side elevation and in somewhat diagrammatic form, showing an arrangement for treating articles arranged in contact with or adjacent to a stationary electrode and having a series of movable electrodes passed over them;

Figure 19 is an enlarged fragmentary diagrammatic view of the device shown in Figure 18; and Figure 20 is an electrical diagram showing a conventional form of oscillator circuit for supplying high frequency electric current to the heating electrodes employed in the various embodiments of the present invention.

As exemplifying the reduction of the present invention to practice, a generally cylindrical elongated mass will be used, and it will be shown how such masses may be selectively treated to attain any one of several different densities of the electrostatic field with respect to the mass, and the resultant selective intensity of heat treatment. These examples are illustrated diagrammatically in Figures 1, 2, 3, and 14 of the drawings.

It will be seen that the material or mass 10 in Figure 1 comprises an annular body 11 which, in this particular instance is mounted upon or carried by a core 12. In an actual embodiment, the core 12 may represent an electrical conductor insulated by the body 11—which in that case is rubber or some similar dielectric material—or it may indicate the axle of a roller such as may be employed for example in a printing press or the like. Obviously, the mass 10 may wholly comprise a dielectric body 11 without any core 12, within the scope of the invention. In Figure 1 the stippling in the diagram indicates the zone treated by the electrostatic field and it will be seen that this zone comprises the entire cross sectional area of the body 11 and all parts have been heat treated at the same intensity. This uniform effect may be attained for example by the means diagrammatically illustrated in Figure 4 of the drawings in which the mass 10 is mounted between the flat plate electrodes 13 and 14 connected respectively to the opposite sides of a source of high frequeny electric current 15 by means of the wires 16 and 17. It will thus be seen that there will be established an electrostatic field indicated diagrammatically by the lines 20 which will extend across the full diameter of the mass 10 which may either be maintained in a stationary position or rotated between the electrodes.

In Figure 2 of the drawings there is shown a mass 10' comprising a body 11' consisting of an untreated central zone 18 and an annular outer zone 19 which has been affected by the heat generated by an electrostatic field. If this mass 10' is provided with a core 12 as indicated in Figure 2, the illustration may exemplify an insulated electrical conductor of the type in which the insulation comprising the body 11' may be readily stripped from the wire 12 since there is little or no vulcanization of the central portion of the covering body to the surface of the wire or conductor 12.

The effect suggested in Figure 2 may be attained by means of the apparatus shown diagrammatically in Figure 5 of the drawings in which the body 10' is mounted for rotation within the space between the four electrodes 22 and 22', 23 and 23'. These electrodes are preferably in the form of curved plates conforming generally to the curved surface of the mass 10'. The two electrodes 22 and 22' are connected by means of the conductors 24 to one terminal of a source of high frequency current similar to that indicated at 15 in Figure 4, and the two electrodes 23 and 23' are connected by wires 25 to the opposite terminal. The electrodes of the pairs 22 and 23, and 22' and 23' being of opposite instantaneous polarity and having portions in rather close proximity, electrostatic fields will be set up such as indicated at 27 and 28 in Figure 5. Due to the spacing of the electrodes 22 and 22' and the electrodes 23 and 23' the field in the center of the mass is of a very negligible intensity, the treatment being concentrated adjacent the outer portions of the body 10'. The circle indicated at 30 marks an approximate boundary between the zone of intense treatment and the central zone of the negligible treatment by the electrostatic field; this circle 30 being approximately tangent to the line indicating the innermost boundary of the respective fields 27 and 28. It will thus be readily apparent how the arrangement shown in Figure 5 will produce an effect illustrated in the diagram of Figure 2. Obviously, either pair of electrodes could be omitted, but the treatment would be only one-half as effective for a given length of time.

The diagram shown in Figure 3 of the drawings suggests an article or mass $10^2$ in which the dielectric body $11^2$ is treated most intensely within the central zone 18' and to a less extent in the outer annular zone 19'. Assuming a central core 12, as illustrated, the diagram may represent an electrical conductor in which the insulation is vulcanized adjacent the core so as to secure a strong adhesion between the contacting surfaces. Other examples of the use of such an article or mass will readily occur to the operator skilled in the art.

The arrangement shown in Figure 6 of the drawings illustrates one way of attaining the result shown in Figure 3. In this case the mass $10^2$ is rotated between the electrodes 32 and 33 of opposite instantaneous polarity, being connected by means of leads 34 and 35 to the terminals of a source of high frequency current such as at 15 of Figure 4. These electrodes 32 and 33 are preferably of arcuate shape convex with respect to the mass $10^2$ and are of a width equal to the diameter of the circle 37 indicating the approximate boundary between the intensely treated central zone less intensely treated annular outer zone. It will be seen that during the rotation of the mass $10^2$ the area within the circle 37 corresponding to the zone 18' of Figure 3 will always be within the electrostatic field 40 while the zone outside of the circle 37 will only be intermittently treated as this portion of the mass passes successively through the field.

In Figures 7 and 8 of the drawings there is illustrated an embodiment of the invention wherein the electrodes are stationary as in the cases shown in Figures 4, 5, and 6 but the arrangement of successive series of electrodes is such that the mass 10' to be treated may be drawn longitudinally through the space between the electrodes and receive a selective treatment such as illustrated in Figure 2 of the drawings and previously described in connection with the means shown in Figure 5. In this embodiment of the invention, the arrangement of the electrodes at one station—for example adjacent the section line 8A—8A—is exactly the same as the arrangement shown in Figure 5, and this is illustrated in the portion 8A of Figure 8. The electrodes 22 and 23 establish an electrostatic field 27 extending across a segment of the mass 10' and the field 28 established between the electrodes 22' and 23' similarly treat an opposite segment. The chords marking the inner boundaries of the fields 27 and 28 are tangent to the circle 30. At the next treating station adjacent to line 8B—8B of Figure 7 the respective pairs of electrodes 22 and 23, and 22' and 23' are advanced around the periphery of the mass 10' to an appropriate extent depending upon the number of stations at which these series of electrodes are located. Assuming four stations the electrodes will be advanced approximately 45°. If there are more stations contemplated the electrodes need not be advanced to such a great extent and furthermore the treatment would be much more rapidly effected and the mass 10' could travel through the treating zones at a greater speed. The chords bounding the inner edges of the electrostatic fields 27 and 28 in all cases are approximately tangent to the theoretical circle 30. In Figures 8C and 8D the electrodes are advanced still further and the same relative arrangement of fields maintains. Of course, the series of electrodes 22 and 22' are appropriately connected to one terminal of a source of high frequency current by means of the conductors 24 and the opposite electrodes 23 and 23' are connected by means of the conductors 25 to the other terminal of the source of current. It will be readily apparent how the device just described attains the peripheral treating effect shown in Figure 2 of the drawings.

Another means for attaining the outer peripheral or skin treatment of a mass is shown in Figures 9 and 10 of the drawings. In this case the mass 10', arranged if desired with core 12, is drawn through successive rings or annualar electrodes 42 and 43 by any suitable type of carrier or tractive device. The electrodes 42 are connected by means of the leads 44 to one terminal of a source of high frequency current and the electrodes 43 are connected to the opposite terminal by means of the conductors 45. The annular electrodes 42 and 43 are disposed very closely to the surface of the mass 10' and the electrostatic discharge between respective electrodes 42 and 43 which are of opposite instantaneous polarity forms a field such as indicated by the lines 48 in Figure 9, and as the mass is drawn through the electrodes a zone of treatment such as indicated at 50 in Figure 10 results.

Still another mode of attaining an outer annular treated zone within a mass such as 10' is shown in Figures 11 and 12 of the drawings. In this embodiment two helically formed strap-like electrodes 52 and 53 are arranged to form a cage through which the mass 10' may be drawn. The electrodes 52 and 53 are respectively connected to opposite terminals of a source of high frequency current by means of the conductors 54 and 55 and an electrostatic field such as indicated at 58 is set up between adjacent windings of the electrodes. This results in the production of a treated outer annular zone 50 as shown in Figure 12 similar to the corresponding zone 50 in Figure 10 and the zone 19 shown in Figure 2 of the drawings.

Of course, the spacing of the electrodes in the embodiments shown in Figures 9 and 11 is so determined and the strength of the current so controlled, that there will be little or no electrostatic discharge between windings on opposite sides of the mass.

A projection of the arrangement suggested in Figure 6 of the drawings for obtaining an effect such as shown diagrammatically in Figure 3 is illustrated in Figure 13. In this case successive series of spirally displaced pairs of electrodes are arranged similar to the stations shown in Figure 7 of the drawings; however, in this case the aim is to treat the central portion of the mass $10^2$ more intensely than the outer annular portion. For this purpose the electrodes 32 and 33 at the first station shown in the portion 13A of Figure 13 are disposed exactly as in the case of Figure 6. At the next station illustrated diagrammatically in subordinate Figure 13B the electrodes are displaced circumferentially an angular distance of approximately 45°. In Figures 13C and 13D the electrodes at successive stations are displaced similarly so that a thorough distribution of the field 40 from various angles may be obtained. The bounding chords of the fields 40 are tangent to a circle indicated at 37 which marks the approximate boundary between the inner intensely treated zone and the outer less strongly treated part.

In Figures 14 and 15, there is illustrated a still different effect and means by which it may be obtained. The zone of most intense treatment, in this case, designated 19A is intermediate the central part 18A of the mass $10^3$ and an outer marginal portion 19B of less intense treatment. This treatment is effected by one or more pairs of electrodes arranged as at 22A and 23A in Figure 15, the effective width of the electrodes being less than a radius of the mass and disposed so that the margins of the field 27A are respectively tangent to the circles 30A and 30B approximately bounding the zone 19A.

To attain a pattern of electrostatic heat treatment as diagrammatically shown in Figure 2, instead of rotating the mass 10' as in the arrangement shown in Figure 5 this mass may be held stationary and the cage or frame of electrodes 22A, 22B, 23A, and 23B (Figure 16) may be rotated around the mass. The electrodes are carried by an annular ring support 55 about which a driving belt 56 may be trained, this belt being driven from a pulley 57 carried upon a drive shaft 58 rotated from a suitable source of power. The electrodes of the respective pairs are connected to the appropriate terminals of the source of high frequency current in a manner well known in the art.

A similar arrangement of rotating electrodes for obtaining emphasis of treatment upon a circular zone is shown in Figure 17 of the drawings in which the electrodes 32A and 33A are carried by a ring 65 which is rotated by a belt drive arrangement 66 similar to that shown in Figure 16. The electrodes are appropriately connected to a suitable source of high frequency current by any suitable conventional means.

In Figures 18 and 19 there is shown means for treating articles of various configurations by a series of moving electrodes all of which are connected with one terminal of a high frequency source, an electrode of opposite instantaneous polarity providing a rest for the articles. This latter electrode is indicated at 70 in Figure 18 and is connected to an appropriate terminal by the conductor 71. The articles 100 rest upon the electrodes 70 and are disposed directly beneath the traveling belt 73 which is trained about the rollers 74 and 75, this belt carrying a series of transversely extending electrodes 76 which are all of opposite instantaneous polarity to the electrode 70. The axle 78 of the roller 74 is in electrical communication with the electrodes 76 and is connected through the brush contact 79 and the conductor 80 with the other terminal of the source of current. Figure 19 is a fragmentary plan view of part of the arrangement shown in Figure 18. The underlying electrode being indicated at 70, the articles to be treated at 100, and one of the transverse moving electrodes 76 being shown moving in the direction of the arrows 85. The articles 100 may rest in fixed position on the electrode 70 or they may be moved at varying speeds in either direction thereon depending upon the nature of the treatment desired, and the duration and intensity thereof.

The high frequency source indicated generally at 15 in Figure 4 of the drawings and referred to in connection with the other figures, may be of any suitable form. One conventional oscillator circuit for this purpose is diagrammatically illustrated in Figure 20 of the drawings. This arrangement includes a vacuum tube triode having its cathode 90 connected to the negative side B− of a suitable high potential direct current source. The plate 91 of the triode is connected through the radio frequency choke 92 to the positive side B+ of the direct current source. The tank coil 93 is connected at one end through the blocking condenser 94 to the plate 91 and is connected at its other end to the cathode 90 and to ground.

The conductors leading to the treating electrodes are indicated at 16 and 17.

The oscillator is operated at a frequency which may for example be of the order of 20 megacycles and acts to produce the electrostatic fields between the opposed electrodes shown in the other figures of drawings illustrating the various embodiments of the invention.

The term "axis of the electrodes" as used in the claims refers to the bisector of the angle between the lines passing through the center of each electrode of one pair and the axis of the mass of material where both of the electrodes of one pair are disposed on the same side of a diameter. Where the electrodes of a pair are centered on a diameter, as for instance in Figure 13, the term "axis of the electrodes" refers to the line passing through the center of the electrodes and the center of the mass.

Although certain examples and embodiments of the present invention in its various aspects have been illustrated and described herein, the invention is not to be considered as limited thereto but is susceptible of various changes and modifications in structure and procedure and in the nature of the masses, materials, or articles treated without departing from the scope of the invention as defined in the following claims.

Having thus described the invention, what is claimed as new and desired to be secured by Letters Patent is:

1. In a device for the electrostatic treatment of a non-metallic dielectric mass which is symmetrical about a longitudinal axis, a source of high frequency alternating current, electrodes adapted to be disposed externally of said mass and spaced apart and disposed on opposite sides of a diameter of said mass, means connecting said electrodes with said source so that the oppositely disposed electrodes are of opposite instantaneous polarity so as to create an electrostatic field between them, means for effecting relative rotational movement between said mass and said electrodes about said axis, the projections of said electrodes on said diameter extending from a point spaced from the periphery of said mass to a point spaced from the axis of said mass, whereby during relative rotational movement an intermediate annular zone of said mass is given a more intense treatment than either the central or peripheral zones.

2. In a device for the electrostatic treatment of a dielectric mass which is substantially symmetrical about a longitudinal axis, a source of high frequency alternating current, a series of pairs of electrodes adapted to be disposed externally of said mass and successively along said axis, the electrodes of each pair being connected to said source so as to be of opposite instantaneous polarity to create an electrostatic field between them, and disposed on opposite sides of a diameter of said mass so that the projection of the widths of said electrodes on said diameter is less than said diameter, the axes of said successive pairs of electrodes being angularly displaced about said axis of said mass with respect to the preceding pair, and means for moving said mass along its axis, whereby an annular zone of said mass symmetrical about its axis is more intensely treated by said electrostatic field than other portions of said mass.

3. In a device for the electrostatic treatment of a dielectric mass which is substantially symmetrical about a longitudinal axis, a source of high frequency alternating current, a series of pairs of electrodes adapted to be disposed externally of said mass and successively along said axis, the electrodes of each pair being connected to said source so as to be of opposite instantaneous polarity to create an electrostatic field between them, and disposed on opposite sides of a diameter of said mass so that the projection of the widths of said electrodes on said diameter is less than said diameter and touches the periphery of the mass, the axes of said successive pairs of electrodes being angularly displaced about said axis of said mass with respect to the preceding pair, and means for moving said mass along its axis whereby an annular outer zone of said mass symmetrical about its axis is more intensely treated by said electrostatic field than other portions of said mass.

4. In a device for the electrostatic treatment of a dielectric mass which is substantially symmetrical about a longitudinal axis, a source of high frequency alternating current, a series of pairs of electrodes adapted to be disposed externally of said mass and successively along said axis, the electrodes of each pair being connected to said source so as to be of opposite instantaneous polarity to create an electrostatic field between them, and disposed on opposite sides of a diameter of said mass so that the projection of the widths of said electrodes on said diameter is less than said diameter and touches the axis of said mass, the axes of said successive pairs of electrodes being displaced about said axis of said mass through an angle with respect to each preceding pair, and means for moving said mass along its axis, whereby an annular central zone of said mass symmetrical about its axis is more intensely treated by said electrostatic field than another annular zone of said mass.

5. In a device for the electrostatic treatment of a dielectric mass which is substantially symmetrical about a longitudinal axis, a source of high frequency alternating current, a helical electrode surrounding said mass and connected to one terminal of said high frequency source, another helical electrode substantially identical in shape and size with said first named electrode, surrounding said mass and intermeshed with said first named electrode so that its windings are uniformly spaced along the surface of said mass from the adjacent windings of said first named helical electrode, whereby an electrostatic field is set up between said windings which traverses the adjacent outer peripheral portion of said mass, and means for moving said mass through said helical electrodes so that the entire outer peripheral zone of said mass is treated.

6. In a device for the electrostatic treatment of a mass which is substantially symmetrical about a longitudinal axis, a source of high frequency alternating current, a pair of electrodes adapted to be disposed externally of said mass and connected with said source so as to be of opposite instantaneous polarity, said pair of electrodes being disposed upon one side of a diameter of said mass and the electrodes of said pair being spaced apart on opposite sides of a radius of said mass which is perpendicular to said diameter, a series of additional pairs of electrodes adapted to be disposed externally of and along said mass and similarly arranged relative thereof but the axis of each successive pair being angularly displaced about said axis of said mass from the next preceding one, means for effecting relative longitudinal movement of said mass and said pairs of electrodes whereby an annular zone of said mass symmetrical about said axis of said mass is more intensely treated than other portions thereof.

7. A method of treating a mass of material capable of having its physical or chemical characteristics altered by a high frequency electrical field, said material being symmetrical about an axis, comprising the steps of arranging a pair of electrodes externally of and adjacent to said mass and connected to the opposite sides of a source of high frequency electrical energy to thereby create an electrostatic field therebetween, said electrodes being so arranged adjacent said mass of material that the predominant part of said electrostatic field traverses only a selected fractional cross-sectional area of said material, and causing such relative movement between said electrodes and the axis of said mass of material as to effect a selective treatment of a selected annular zone of said material symmetrical about said axis.

8. A method of treating a mass of material capable of having its physical or chemical characteristics altered by the influence of a high frequency electrical field, said material being symmetrical about an axis, said method comprising the steps of positioning a pair of electrodes externally of and adjacent said material, said electrodes being connected to the opposite sides of a source of high frequency electrical energy and so disposed with respect to said mass that the projection of the intervening electrostatic field between said electrodes on said mass is less than the transverse dimension of said material and causing such relative movement between said electrodes and the axis of said mass to effect differential treatment of different concentric annular zones of said mass symmetrical with said axis.

9. A method of treating a mass of material capable of having its physical or chemical characteristics altered by the influence of a high frequency electrical field said material being symmetrical about an axis, comprising the steps of positioning a pair of electrodes externally of but adjacent said material, said electrodes being connected to the opposite sides of a source of high frequency electrical energy and so disposed with respect to said mass that the projection of the intervening electrostatic field between said electrodes is less than half the transverse dimension of said mass of material, and causing relative rotational movment between said electrodes and said material about said axis to produce substantially uniform treatment throughout a selected annular zone of said material symmetrical about said axis which is different from the treatment of an adjacent annular symmetrical zone.

10. The method as set forth in claim 8 in which the step of positioning the electrodes includes the disposition of the electrodes in such manner that the intervening electrostatic field between said electrodes traverses said mass of material in a direction parallel to the axis of said mass and the relative movement is translatory and parallel to said axis.

11. The method as set forth in claim 8 in which the step of positioning the electrodes includes the disposition of the electrodes in such manner that the intervening electrostatic field between said electrodes traverses said mass of material in a direction substantially transverse of the axis of said mass and the relative movement is translatory and parallel to said axis.

12. The method as set forth in claim 8 in which the step of positioning the electrodes includes the disposition of the electrodes in such manner that the intervening electrostatic field between said electrodes traverses said mass of material in a direction substantially transverse of the axis of said mass and the relative movement is rotational about said axis.

13. A method of treating a mass of material capable of having its physical and chemical characteristics altered by a high frequency electrical field, said material being symmetrical about an axis, said method comprising the steps of arranging a series of pairs of electrodes connected to the opposite sides of a source of high frequency electrical energy and disposed externally of, adjacent and along said mass with the axes of the successive pairs of said electrodes being angularly displaced about the axis of said mass from the axis of the next preceding pair, said electrodes being so disposed relative to said mass that the intervening electrostatic field between said electrodes traverses only a selected cross-sectional annular zone of said material, and causing such relative movement between said electrodes and the axis of said mass of material as to effect a selective treatment of a selected annular zone of said material symmetrical about said axis.

14. A method of treating a mass of material capable of having its physical or chemical characteristics altered by a high frequency electrical field, said material being symmetrical about an axis, comprising the steps of arranging electrodes externally of and adjacent to said mass and connected to the opposite sides of a source of high frequency electrical energy to thereby create an electrostatic field therebetween, said electrodes being so arranged adjacent said mass of material that the predominant part of the electrostatic field created by all the electrodes traverses only a selected fractional cross-sectional annular zone of said material symmetrical about said axis, and causing such relative translatory movement between said electrodes and the axis of said mass of material as to effect a selective treatment of a selected annular zone of said material symmetrical about said axis.

H. H. GIODVAD GRELL.
HARRY W. RICHARDS.